US 6,487,521 B1

(12) United States Patent
Carney

(10) Patent No.: US 6,487,521 B1
(45) Date of Patent: Nov. 26, 2002

(54) METHOD, SYSTEM, AND PROGRAM FOR MONITORING A DEVICE TO DETERMINE A POWER FAILURE AT THE DEVICE

(75) Inventor: Dennis Michael Carney, Louisville, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/349,056

(22) Filed: Jul. 7, 1999

(51) Int. Cl.$^7$ ................................................. G06F 3/12
(52) U.S. Cl. ........................ 702/186; 702/122; 702/116; 702/183
(58) Field of Search .............................. 709/224, 219, 709/301, 223; 714/42; 713/1, 340, 2, 300, 323, 31

(56) References Cited

U.S. PATENT DOCUMENTS

| | | | | |
|---|---|---|---|---|
| 5,226,120 A | * | 7/1993 | Brown et al. ............... | 395/200 |
| 5,235,676 A | | 8/1993 | Clay et al. .................. | 395/113 |
| 5,371,848 A | * | 12/1994 | Casey et al. ............... | 395/161 |
| 5,602,974 A | | 2/1997 | Shaw et al. ................ | 395/114 |
| 5,678,044 A | | 10/1997 | Pastilha et al. ............. | 395/615 |
| 5,692,111 A | | 11/1997 | Marbry et al. ............. | 395/114 |
| 5,699,495 A | | 12/1997 | Snipp ......................... | 395/114 |
| 5,708,812 A | | 1/1998 | Van Dyke et al. ......... | 395/712 |
| 5,716,148 A | | 2/1998 | Tamagaki .................... | 400/74 |
| 5,742,825 A | | 4/1998 | Mathur et al. .............. | 395/680 |
| 5,819,051 A | | 10/1998 | Kusters ....................... | 395/856 |
| 5,845,058 A | | 12/1998 | Shaw et al. ................ | 395/114 |
| 5,862,404 A | * | 1/1999 | Onaga ........................ | 395/828 |
| 6,021,436 A | * | 1/2000 | Garret ........................ | 709/224 |
| 6,101,555 A | * | 8/2000 | Goshey et al. ............. | 709/301 |
| 6,108,492 A | * | 8/2000 | Miyachi ..................... | 395/114 |
| 6,182,132 B1 | * | 1/2001 | Bilakanti et al. .......... | 709/223 |
| 6,266,150 B1 | * | 7/2001 | Brossman et al. ......... | 385/1.15 |
| 6,266,693 B1 | * | 7/2001 | Onaga ........................ | 709/219 |
| 6,269,398 B1 | * | 7/2001 | Leong et al. ............... | 709/224 |
| 6,269,444 B1 | * | 7/2001 | Aguilar et al. ............. | 713/1 |
| 6,269,450 B1 | * | 7/2001 | Iwata et al. ................ | 713/340 |
| 6,269,458 B1 | * | 7/2001 | Jeter et al. ................. | 714/42 |
| 6,272,618 B1 | * | 8/2001 | Tyner et al. ............... | 712/31 |
| 6,272,630 B1 | * | 8/2001 | Chen et al. ................ | 713/2 |
| 6,272,642 B2 | * | 8/2001 | Pole, II et al. ............ | 713/300 |
| 6,272,645 B1 | * | 8/2001 | Wang ......................... | 713/323 |

OTHER PUBLICATIONS

Jacobs, John. Windows NT Printing: Flow of Control. Microsoft TechNet, vol. 4, Issue 9, Sep. 1999 [online], [retrieved on Nov. 7, 1999]. Retrieved from the Internet <URL: http://technet.microsoft.com/cdonline/content/complete/windows/winnt/winntas/technote/teroubleshooting..>.

Microsoft Corporation. Windows NT Printing Model. Microsoft Corporation, (c) 2000 [online], [retrieved on Jun. 2, 2000]. Retrieved from the internet <URL: http://msdn-.microsoft.com/library/winresource/dnwinnt/S83B1.HTM> [Available on the Internet before Dec. 1999].

McLaughlin III, Leo J. Line Printer Daemon Protocol. Network Printing Working Group, rfc1179, Aug. 1990 [online], [Retrieved on June 2, 1000].

Microsoft Corporation. Windows NT Printer Drivers. Microsoft Corporation, (c) 2000 [online], [retrievd on Jun. 2, 2000] [Available on the Internet before 12/99].

* cited by examiner

Primary Examiner—Marc S. Hoff
Assistant Examiner—Felix Suarez
(74) Attorney, Agent, or Firm—David W. Victor; Konrad Raynes Victor & Mann LLP

(57) ABSTRACT

Disclosed is a method, system, and program for monitoring a device. A determination is made as to a first time, a current time, and a system-up time. The current time follows the first time and the system-up time indicates an elapsed time at the device since the last power cycle. A determination is then made as to whether the current time minus the first time is less than the system up time to determine whether the device has started a new power cycle since the first time.

31 Claims, 3 Drawing Sheets

Print Job ⟶

METHOD, SYSTEM, AND PROGRAM FOR MONITORING A DEVICE TO DETERMINE A POWER FAILURE AT THE DEVICE

CROSS-REFERENCE TO RELATED APPLICATIONS

This application is related to the following co-pending and commonly-assigned patent applications, all of which are filed on the same date herewith, and which are incorporated herein by reference in their entirety:

"Method, System and Program for Detecting Communication Code Information," to Dennis Michael Carney, Charles David Johnson, Ryan Hoa Nguyen, having U.S. patent application Ser. No. 09/348,251;

"Method, System, and Program for Establishing Network Contact," to Dennis Michael Carney and Ryan Hoa Nguyen, having attorney docket no. BO9-99-011; U.S. patent application Ser. No. 09/348,966; and "Method, System, and Program for Monitoring a Device with a Computer Using User Selected Monitoring Settings," to Dennis Michael Carney, Linda Sue Liebelt, and Ryan Hoa Nguyen, having U.S. patent application Ser. No. 09/348,358.

BACKGROUND OF THE INVENTION

1. Field of the Invention

The present invention relates to a method, system, and program for monitoring a device to determine whether the device has rebooted or gone through a new power cycle.

2. Description of the Related Art

Network printing systems generally comprise an assemblage of different printers, client computers, servers, and other components connected over a network. A network administrator or user may want to monitor the status of print jobs being printed or the general operational status of the printer. A computer may monitor a remote printer over a network using a network protocol, such as SNMP or TCP/IP, or a line connection such as a parallel port connection. Current printer software includes a print monitor component to monitor printer operations. For instance in the Microsoft Windows 95/98 systems, the user may display a queue of print jobs for the printer and a current status of the print jobs. The status usually indicates whether a particular queued job was sent to the printer and its status.

One print monitor protocol is the Line Printer Daemon (LPR) protocol, which is a component of the TCP/IP network protocol. LPR is used to communicate with printers across the network. LPR runs by executing a daemon on the host computer, which is then used to transmit commands, print jobs and other information to the printer and receive data and information from the printer. The LPR protocol allows a client application on one computer to send a print job to a print spooler service on another computer. The LPR daemon monitors a printer port to which it is assigned by "listening" for messages from the client. The host computer would send a print command to the LPR daemon, which would then execute the command and communicate with the printer to cause the printer to follow the command. The LPR protocol includes a command to request the state of the printer, such as pages printer, queued jobs, etc. However, LPR is not capable of providing detailed error status information back to the client application.

Client computers may also communicate with network printers using the Simple Network Management Protocol (SNMP). A computer managing a printer may use the SNMP protocol to control the operation of the managed printer and determine job and print status for the printer. SNMP provides for a limited set of operations, including the get and set commands which, respectively, allow the managing computer to retrieve data and configure the printer. These commands may be used to monitor printer operations. Another SNMP command is the "trap" command which causes the managed agent to send an event notification to the management system or printer manager identifying the occurrence of conditions such as threshold that exceeds a predetermined value. The managing computer registers a trap by writing information to the managed agent, which causes the managed agent to notify the registering computer of the event indicated in the registration.

SNMP is advantageous as a communication protocol because neither the agent nor manager rely on the other to continue operating. Thus, one may fail, and the other would carry on. SNMP further does not require the establishment of a communication path prior to the transmission of data. As a result, with SNMP, there is no guarantee that a transmission was received. Although most messages do transmit successfully, those that do not cannot be retransmitted. On the other hand, SNMP's simplicity and connectionless communication also produce a degree of robustness. Neither the manager nor the agent relies on the other for its operation. Thus, a printer manager may continue to function even if the printer fails.

In certain cases, a power failure at a printer would erase all jobs that were pending in the printer. A printer monitor may find that the printer does not include any information on a print job previously sent. There may be many causes for the absence of a print job on the printer, including the occurrence of a power failure. For a printer monitor to provide fine grained monitoring of a device, the printer monitor would want to determine whether the absence of information is a result of a power failure. However, the lack of any information on a sent job at the printer after a power failure does not necessarily indicate that the job was lost as a result of power failure as the job may have completed printing or the job may not yet have been logged by the printer. There is thus a need in the art for providing a mechanism to determine whether the absence of information on a print job at the printer is a result of a power failure or some other event.

SUMMARY OF THE PREFERRED EMBODIMENTS

To overcome the limitations in the prior art described above, preferred embodiments disclose a method, system, and program for monitoring a device. A determination is made as to a first time, a current time, and a system-up time. The current time follows the first time and the system-up time indicates an elapsed time at the device since the last power cycle. A determination is then made as to whether the current time minus the first time is greater than the system-up time to determine whether the device has started a new power cycle since the first time.

In further embodiments, the device is capable of receiving and processing tasks. The first time indicates a time when the task was sent to the device and determining the system-up time comprises querying the device to determine the system-up time. For instance, the device being polled may be a printer, and the device, such as a computer, performing the polling, may use the SNMP protocol to communicate with the printer.

In further embodiments, the device maintains information on tasks the device is processing. The device is polled to obtain information on a polled task previously sent to the device and a response from the device is received in response to the polling. An indication is made, such as by setting a flag, that the device includes information on the polled task after determining that the response indicates that the device includes information on the polled task. Another polling operation on the polled task is performed after determining that the response indicates that the device includes information on the polled task.

Preferred embodiments provide a mechanism for determining whether a power failure, i.e., initiation of a new power cycle, has occurred since the last time the device was monitored. In this way, if the device did not include information on the task previously sent and a determination is made that a power failure occurred, then an assumption can be made that the device does not include information on the task as a result of the power failure. If a determination is made that a power failure did not occur at the device, then the absence of information on a previously sent task would indicate that either the device has not yet recorded information on the previously sent task or that the task has completed and information thereon has been removed. In referred embodiments, the system monitoring the device may have set a flag in a previous polling operation indicating that the device had information on the task. If in the subsequent poll, no power failure was determined and the flag was set, then it can be assumed that the device completed processing the task and removed information on the completed task.

With the preferred embodiments, a system monitoring the device can determine the reason for the absence of information on a task sent to the device from the device and take appropriate action based on such determination.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Computing Environment

Figure 1:
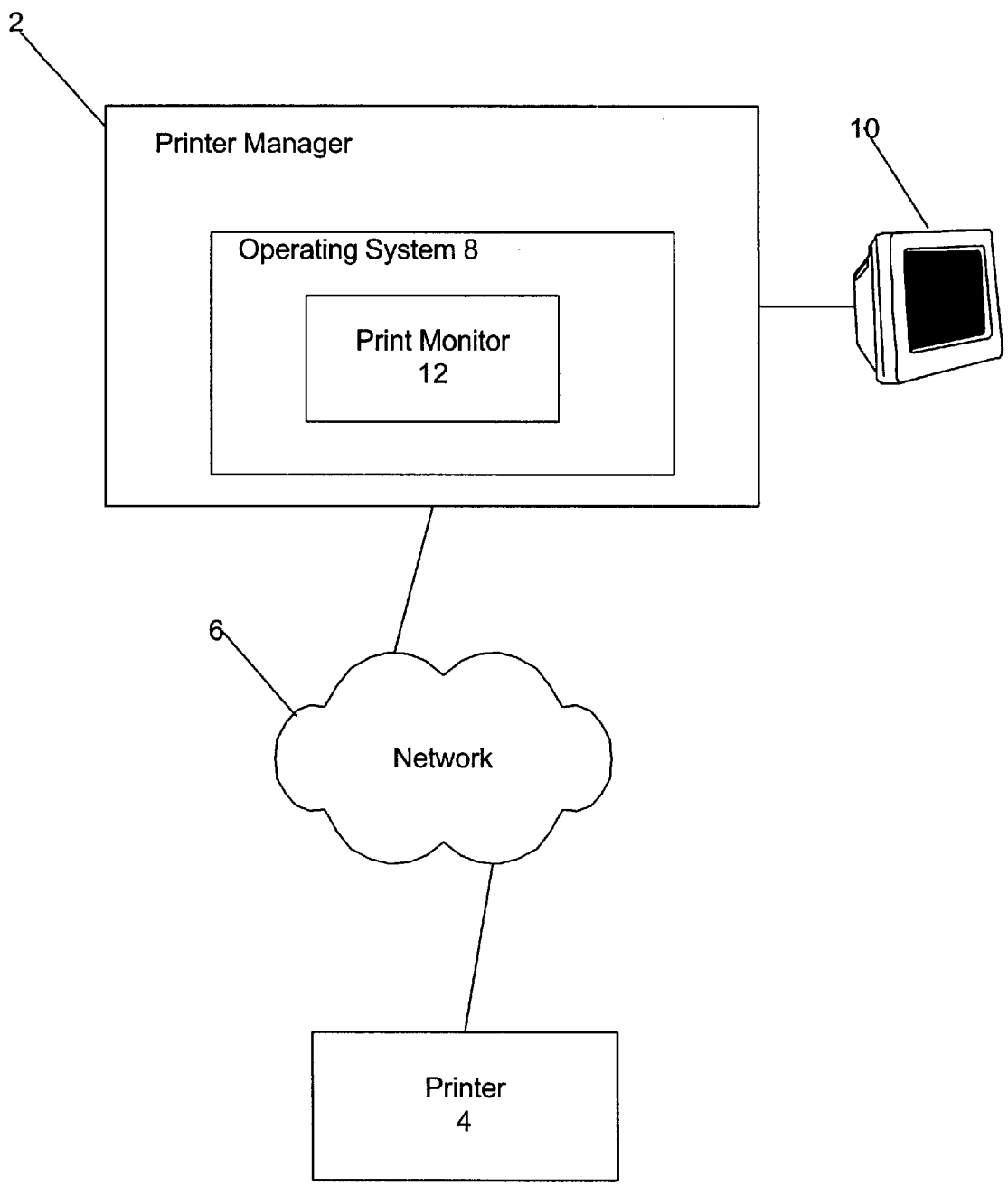
FIG. 1 is a block diagram illustrating a computing environment in which preferred embodiments of the present invention are implemented.

FIG. 1 illustrates a computing environment in which preferred embodiments of the present invention are implemented. A printer manager 2 is in communication with a printer 4 via a network 6. The network 6 may be comprised of any suitable network architecture known in the art, such as LAN, Ethernet, WAN, System Area Network (SAN), Token Ring, LocalTalk, TCP/IP, the Internet, etc. Alternatively, there may be separate and different networks between the printer manager 2 and the printer 4.

The printer manager 2 is preferably comprised of a computer, either a client or server, that manages printer operations over a network, such as performing spooling and queuing for print jobs. The computer 2 may be any computer device known in the art, such as a desktop computer, laptop computer, workstation, mainframe, server, personal digital assistant (PDA), etc. The computer 2 would include an operating system 8 such as AIX, OS/390, UNIX, OS/2, MVS, WINDOWS NT, 95/98, LINUX, etc. The printer manager 2 may also include software to allow a network administrator or user to manage network printers, such as the IBM Network Printer Manager software solutions to submit and monitor print jobs, and perform other network printer manager functions. Attached to the printer manager 2 is a display monitor 10, which may be comprised of any computer display device known in the art. An input device (not shown) would also be provided with the printer manager 2 to allow a systems administrator or other user to enter data into the printer manager 2. This input device may be comprised of any input means known in the art, including a mouse, keyboard, touch screen display, voice activated input, electronic pen, etc.

The printer 4 may be any printer, plotter, three dimensional model builder or other similar output device known in the art. In preferred embodiments, the printer manager 2 and printer 4 includes include a network card and one or more ports for intercommunication over the network 6. The printer manager 2 would transmit print jobs to the printer 4 for printing in a manner known in the art.

In preferred embodiments, the printer manager 2 and printer 4 may communicate using the Simple Network Management Protocol (SNMP), or any other suitable network protocol known in the art, such as TCP/IP, LPR, etc. The SNMP protocol is described in Request for Comments No. 1157 (May 1990), entitled "A Simple Network Management Protocol (SNMP)," and No. 1759 (March 1995), entitled "Printer MIB," which documents are incorporated herein by reference in their entirety. The SNMP protocol provides for the interoperability of different devices communicating over a TCP/IP network, such as the Internet. The printer 4 maintains in a Management Information Base (MIB) database information on all jobs that the printer has received. At some point in the processing of a newly received job, the printer 4 places the job in a job MIB. When the print job has completed, the printer 4 removes information on the completed print job from the job MIB.

In preferred embodiments, the printer manager 2 would communicate with the printer 4 via a port, and monitor that port for printer communications. Likewise, the printer 4 would dedicate a port for communicating with the printer manager 2 in a manner known in the art, such as the SNMP art.

The printer manager 2 further includes a printer monitor program 12 component which is used to communicate with the printer 4, and perform operations such as sending print jobs to the printer and monitoring printer status. The printer monitor 12 would incorporate the communication protocol, such as SNMP, to communicate directly with the printer 4 to perform the printer manager functions.

Those skilled in the art will appreciate that network protocols, e.g., Hypertext Transfer Protocol (HTTP), Data Link Control (DLC), etc., other than SNMP, may be used. Moreover, the printer manager 2 and printer 4 may be capable of communicating using one of multiple network protocols.

Monitoring the Status of a Print Job at Printer

When the printer monitor 12 queries the printer 4 to determine the status of a print job, the printer monitor 12 seeks information from the job MIB in the printer 4 on the print job. If a print job previously sent to the printer 4 is not in the job MIB, then there are three possibilities: (1) the print job has completed and was cleaned out of the job MIB during the MIB's normal clean-up operation to remove completed jobs; (2) the print job is queued in the printer 4 but has not yet been placed in the job MIB; and (3) a power failure caused the loss of the print job.

Figure 2:
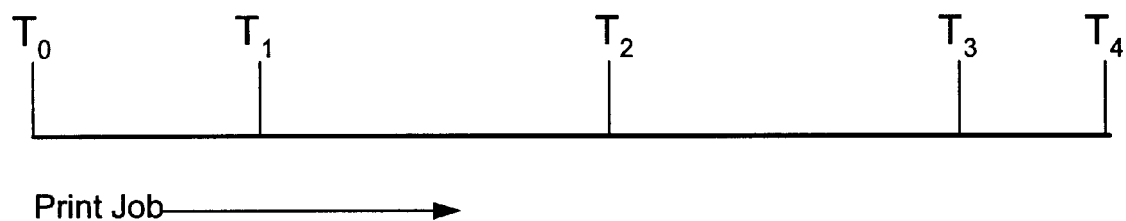
FIGS. 2 illustrates a time line of the processing of a print job sent to a printer.

FIG. 2 illustrates a time line of the processing of a job by the printer 4. At To the printer 4 receives the print job; at $T_1$ the printer 4 writes information about the print job into the job MIB; at $T_2$ the printer 4 starts printing the job; at $T_3$ the printer 4 completes the print job; and at $T_4$ the printer 4 purges information on the completed print job from the job MIB. If the print monitor 12 queries the job MIB in the printer 4 for information on the print job and there is no information on the print job in the job MIB, then there are the three possibilities mentioned above. The print job could be at a time between $T_0$ and $T_1$ where the printer 4 has not yet placed the print job in the job MIB; the print job could be at a time after $T_4$, i.e., completed and removed from the job MIB; or the print job could have been purged from the printer 4 as a result of a power failure.

Figure 3:
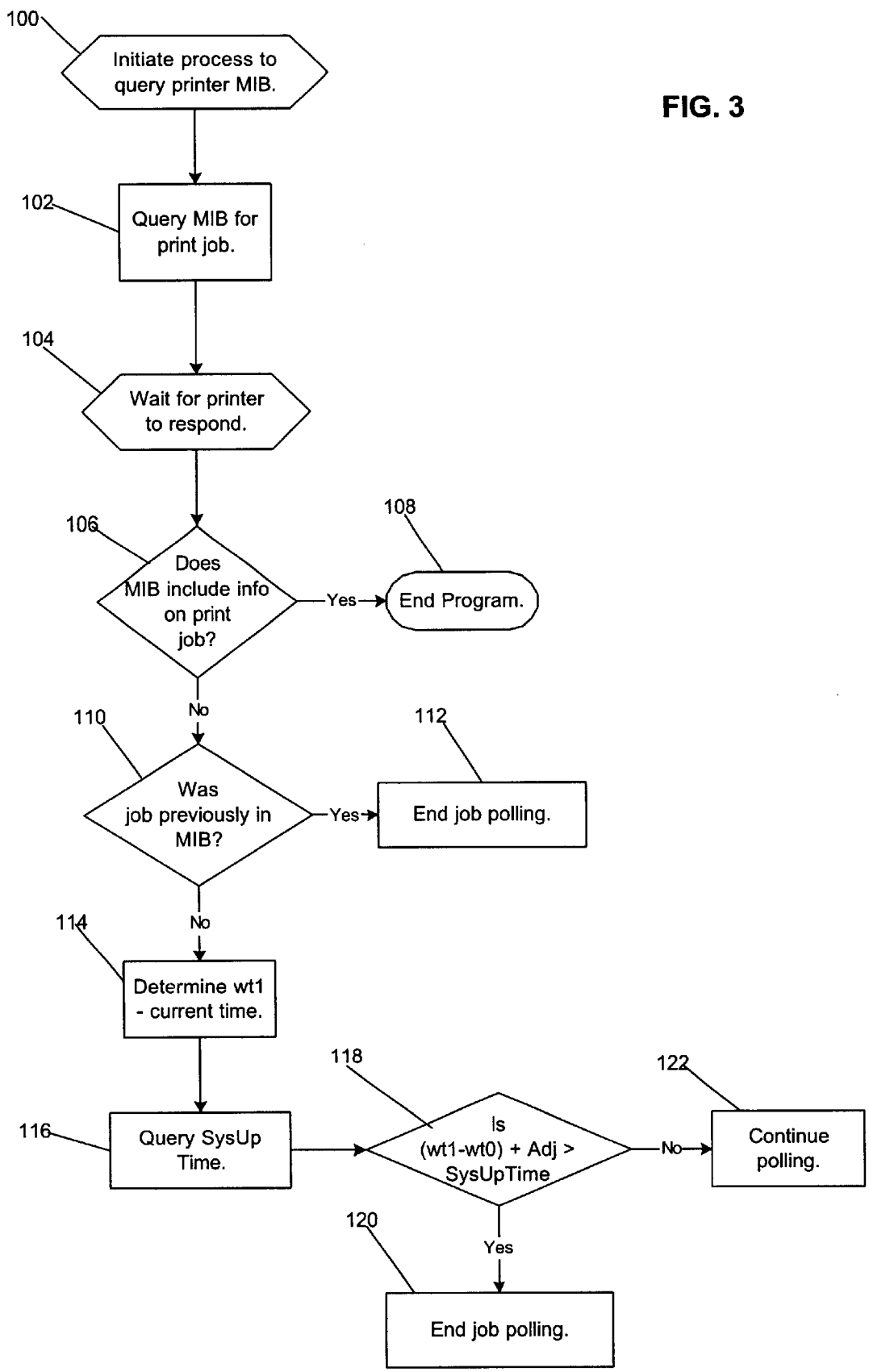
FIG. 3 illustrates logic to determine the reason for the absence of information on the print job at the printer in accordance with preferred embodiments of the present invention.

The print monitor 12 would want to know whether the absence of information on a print job in the job MIB is a result of a power failure. If the print job is not in the job MIB because of a power failure, then the print monitor 12 does not need to continue polling for the print job, and may initiate a power failure mode to resubmit the print job. If the print job is not in the job MIB and there has been no power failure, then the print monitor 12 would continue monitoring for the print job until it has completed. The logic of FIG. 3 provides an algorithm that the print monitor 12 implements to monitor a print job to determine whether the absence of information in the job MIB is the result of a power failure or job completion. The related and co-pending patent application entitled "Method, System, and Program for Monitoring a Device with a Computer Using User Selected Monitoring Settings," having attorney docket no. B09-99-012, which application was incorporated by reference above, describes methods for setting the frequency of when the print monitor 12 monitors for print job. The logic of FIG. 3 provides further detail of actions the print monitor 12 would take when polling the printer 4 for print job information.

Control begins at block 100 with the print monitor 12 querying the job MIB for information on a print job. In preferred embodiments, the print job remains in the MIB for a predetermined amount of time before being purged from the job MIB. In such case, the print monitor 12 initiates the program of FIG. 3 at intervals equal or less than to the time a print job remains in the job MIB after job completion. By using such a polling interval, the print monitor 12 is assured that it will be able to monitor the print job at some point when the print job has begun or completed printing.

After beginning the polling operation, the print monitor 12 queries (at block 102) the job MIB for information on a print job and waits (at block 104) for a response. For instance, if the network 6 utilizes the SNMP protocol for communications, then the print monitor 12 could use the SNMP get command to obtain information from the job MIB on the print job. Upon receiving a response, the print monitor 12 determines (at block 106) whether the job MIB includes information on the print job; either the printer 4 returns status on the requested job or indication that the job MIB does not include any information on the polled print job. If information on the print job in the job MIB is returned, then the program ends at block 108. Prior to ending the program, in preferred embodiments, the print monitor 12 would set a flag indicating that the job MIB includes information on the print job, which means the printer 4 is printing or completed printing the print job. This flag is used in later operations as discussed below.

If information on the print job is not returned, then the printer monitor 12 determines (at block 110) whether the job was previously in the job MIB. The printer may use the flag value set previously at block 108 to make this determination. If the printer monitor 12 determines that the print job was printing during previous polling operations, i.e., was in the job MIB, then the absence of the print job from the job MIB may be the result of a power failure or the completion of the print job and removal from the job MIB. As discussed, the print monitor 12 monitors at intervals at least equal to the interval at which completed print jobs are removed from the job MIB. Thus, the print monitor 12 is never likely to fail to poll when the print job is in the job MIB and printing or completed printing. Regardless of the reason for the absence of a previously registered print job from the MIB, i.e., job completion or power failure, the printer monitor 12 needs to stop polling for the job (at block 112) because the job is no longer in the printer 4.

Otherwise, if the print job was not previously registered in the job MIB, then the print monitor 12 needs to determine whether the current absence of the job from the job MIB is the result of either a power failure or delay in the job being registered in the job MIB. To make this distinction, the print monitor 12 begins a process at block 114 to determine whether a power failure occurred. To determine the occurrence of a power failure, the printer monitor 12 determines (at block 114) the current time (wt1) at the printer manager and then queries (at block 116) the printer 4 for the SysUpTime. The SysUpTime is the number of seconds from the time the printer 4 started-up, or the time the printer has been continuously powered-up, i.e., the duration of the current power cycle.

The print monitor 12 then performs a calculation (at block 118) to determine whether the system was rebooted or initiated a new power cycle while the print job was in the job MIB. This calculation requires the following variables:

wt1—the current time at the printer manager 2.

wt0—the time at the printer manager 2 when the print job was sent to the printer.

Adj—a number of seconds, e.g., 3 seconds, used to adjust for imperfections in the values due to time phase differences between the printer 4 and print manager 2 devices. For instance Adj may account for the situation where the SysUpTime did not have a value of zero when measurement of the duration of the current power cycle began. Further, SysUpTime and wt1 are not measured at exactly the same time because wt1 is measured and then SysUpTime is queried. Thus, Adj further accounts for a phase difference between when wt1 is measured and the SysUpTime query is received by the printer 4.

At block 118, the print monitor 12 determines whether (wt1−wt0) plus Adj is greater than the SysUpTime. The result of wt1 minus wt0 indicates the time the print job has been pending at the printer 4. If this value is greater than the SysUpTime, then the printer 4 must have rebooted, i.e., a new power cycle initiated, while the print job was at the printer 4 because the time the print job has been pending exceeds the SysUpTime. The Adj value adjusts for the situations where SysUpTime started with a value higher than zero and wt1 was measured before the SysUpTime. The equation is thus adjusted by Adj to account for any overestimations of SysUpTime or underestimations of the time the print job was pending. This adjustment reduces the likelihood that a power cycle will not be detected due to overestimations of the SysUpTime or underestimations of the time the print job has been pending.

If the time the print job has been pending, plus any Adj, is greater than the SysUpTime, then it is assumed there has been a power cycle and the print monitor 12 stops job polling(at block 120) for the lost job. Otherwise, if, based on the equation in block 118, the print monitor 12 determines that there was no power failure, i.e., power cycle, then the print monitor 12 assumes the print job is still at the printer 4 and has not yet been placed in the job MIB. In such case, the print monitor 12 continues polling (at block 122) for the print job.

In this way, the preferred logic makes a determination as to whether the absence of a print job in the job MIB is the result of an intervening power failure and the purging of information on a completed print job from the job MIB or delay in the printer 4 placing information on the print job into the job MIB.

Conclusions And Alternative Embodiments

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

The logic of FIG. 3 was described as monitoring for a single print job. However, the print monitor 12 may poll the printer 4 for information on multiple print jobs during a single polling operation or each poll may poll for information on only one print job.

In preferred embodiments, the printer maintained information on a print job in a job MIB. In alternative embodiments, the printer 4 may maintain information on print jobs in any manner known in the art.

Preferred embodiments were described with respect to monitoring the status of a printer or print jobs at the printer. However, the preferred status monitoring embodiments may apply to monitoring any aspect of any type of device attached to the network or computer, where the computer functions as the managing device and the managed object that is monitored may be any device known in the art capable of connecting to the computer directly, e.g., a parallel port or serial port, or through a network, such as an Intranet or the Internet. For instance, preferred embodiments could apply to monitoring facsimile machines, copiers, telephones, display devices, input/output devices, storage devices, communication systems, etc., in communication with the network system. Still further the device being monitored may be any type of output device known in the art capable of receiving and processing tasks sent by other computers.

The logic of FIG. 3 is preferably implemented within the printer monitor application. However, various functions may be implemented in different application programs or in the operating system of the printer manager. This logic is for illustrative purposes. Additional or alternative steps may be performed in addition to those illustrated in the logic. Further, the order of the steps in the preferred logic may also vary.

In preferred embodiments, the printer monitor 12 is implemented in an object oriented design program such as JAVA, C++, or non-object oriented languages, such as Basic, Pascal, FORTRAN, etc.. AIX and OS/2 are registered trademarks of IBM and OS/390 and MVS are trademarks of IBM; WINDOWS is a registered trademark of Microsoft Corporation; UNIX is a registered trademark licensed by the X/Open Company LTD; JAVA is a trademark of Sun Microsystems, Inc.; Linux is a trademark of Linus Torvalds.

In summary, preferred embodiments disclose a method, system, and program for monitoring a device. A determination is made as to a first time, a current time, and a system-up time. The current time follows the first time and the system-up time indicates an elapsed time at the device since the last power cycle. A determination is then made as to whether the current time minus the first time is greater than the system up time to determine whether the device has started a new power cycle since the first time.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is Claimed is:

1. A method for monitoring a device, comprising:
   determining a first time;
   determining a current time, wherein the current time follows the first time;
   determining a system-up time indicating an elapsed time at the device since the beginning of the current power cycle; and
   determining whether the current time minus the first time is greater than the system up time to determine whether the device has started a new power cycle since the first time.

2. The method of claim 1, further comprising providing an adjustment factor, wherein determining whether the device has started a new power cycle since the first time comprises determining whether the current time minus the first time plus the adjustment factor is greater than the system-up time.

3. A method for monitoring a device, comprising:
   determining a first time;
   determining a current time, wherein the current time follows the first time;
   determining a system-up time indicating an elapsed time at the device since the beginning of the current power cycle; and
   determining whether the current time minus the first time is greater than the system up time to determine whether the device has started a new power cycle since the first time, wherein the first time and current time are measured at a monitoring device that monitors the device and wherein determining the system-up time comprises querying the device to determine the system-up time.

4. The method of claim 1, wherein the device is capable of receiving and processing tasks, further comprising sending a task to the device, wherein the first time indicates a time when the task was sent to the device and determining the system-up time comprises querying the device to determine the system-up time.

5. The method of claim 4, wherein the device maintains information on tasks the device is processing, further comprising:
   polling the device to obtain information on a polled task previously sent to the device;
   receiving a response from the device in response to the polling;
   indicating that the device includes information on the polled task after determining that the response indicates that the device includes information on the polled task; and
   performing another polling operation on the polled task after determining that the response indicates that the device includes information on the polled task.

6. The method of claim 5, further comprising determining whether indication was made that the device includes information on the polled task, wherein determining the current time, the system-up time, and whether the device has started a new power cycle occurs after determining that the indication was not made that the device includes information on the polled task.

7. The method of claim 5, wherein a subsequent polling operation occurs after a predetermined interval from a previous polling operation, further comprising:
   determining whether indication was made that the device includes information on the polled task; and
   terminating further polling of the device on the polled task after determining that the device does not include information on the polled task and after determining one of: (i) that the device started a new power cycle since the first time and (ii) that indication was made that the device previously included information on the polled task.

8. The method of claim 7, further comprising performing another polling operation on the polled task at the predetermined interval after determining that the device did not start a new power cycle and after determining that no indication was previously made.

9. The method of claim 7, wherein the device maintains information on the task for a predetermined time after completing processing of the task, wherein the predetermined interval does not exceed the predetermined time.

10. The method of claim 5, wherein the device is a printer and the polled task is a print job.

11. A system for monitoring a device, comprising:
   a computer in communication with the device; program logic executed by the computer, comprising:
      (i) means for determining a first time;
      (ii) means for determining a current time, wherein the current time follows the first time;
      (iii) means for determining a system-up time indicating an elapsed time at the device since the beginning of the current power cycle; and
      (iv) means for determining whether the current time minus the first time is greater than the system up time to determine whether the device has started a new power cycle since the first time.

12. The system of claim 11, wherein the program logic further comprises means for providing an adjustment factor, and wherein the program logic for determining whether the device has started a new power cycle since the first time comprises means for determining whether the current time minus the first time plus the adjustment factor is greater than the system-up time.

13. A system for monitoring a device, comprising:
   a computer in communication with the device;
   a clock; and program logic executed by the computer, comprising:
      (i) means for determining from the clock a first time and current time, wherein the current time follows the first time;
      (ii) means for querying the device to determine a system-up time indicating an elapsed time at the device since the beginning of the current power cycle; and
      (iv) means for determining whether the current time minus the first time is greater than the system up time to determine whether the device has started a new power cycle since the first time.

14. The system of claim 11, wherein the device is capable of receiving and processing tasks, and wherein the program logic further comprises means for sending a task to the device, wherein the first time indicates a time when the task was sent to the device and determining the system-up time comprises querying the device to determine the system-up time.

15. The system of claim 14, wherein the device maintains information on tasks the device is processing, and wherein the program logic further comprises:
   means for polling the device to obtain information on a polled task previously sent to the device;
   means for receiving a response from the device in response to the polling;
   means for indicating that the device includes information on the polled task after determining that the response indicates that the device includes information on the polled task; and
   means for performing another polling operation on the polled task after determining that the response indicates that the device includes information on the polled task.

16. The system of claim 15, wherein the program logic further comprises means for determining whether indication was made that the device includes information on the polled task, wherein determining the current time, the system-up time, and whether the device has started a new power cycle occurs after determining that the indication was not made that the device includes information on the polled task.

17. The system of claim 15, wherein the program logic for performing another polling operation further comprises:
   means for determining whether indication was made that the device includes information on the polled task; and
   means for terminating further polling of the device on the polled task after determining that the device does not include information on the polled task and after determining one of: (i) that the device started a new power cycle since the first time and (ii) that indication was made that the device previously included information on the polled task.

18. The system of claim 17, wherein the program logic further comprises means for performing another polling operation on the polled task at the predetermined interval after determining that the device did not start a new power cycle and after determining that no indication was previously made.

19. The system of claim 17, wherein the device maintains information on the task for a predetermined time after completing processing of the task, wherein the predetermined interval does not exceed the predetermined time.

20. The system of claim 15, wherein the device is a printer and the polled task is a print job.

21. The system of claim 11, wherein the computer utilizes the SNMP protocol to communicate with the device over a network.

22. An article of manufacture for use in monitoring a device, the article of manufacture comprising computer usable media including at least one computer program embedded therein that causes the computer to perform:
   determining a first time;
   determining a current time, wherein the current time follows the first time;
   determining a system-up time indicating an elapsed time at the device since the beginning of the current time; and
   determining whether the current time minus the first time is greater than the system up time to determine whether the device has started a new power cycle since the first time.

23. The article of manufacture of claim 22, further comprising providing an adjustment factor, wherein determining whether the device has started a new power cycle since the first time comprises determining whether the current time minus the first time plus the adjustment factor is greater than the system-up time.

24. An article of manufacture for use in monitoring a device and interacting with a monitoring device, the article of manufacture comprising computer usable media including at least one computer program embedded therein that causes the computer to perform:
   determining a first time;
   determining a current time, wherein the current time follows the first time;
   determining a system-up time indicating an elapsed time at the device since the beginning of the current time; and
   determining whether the current time minus the first time is greater than the system up time to determine whether the device has started a new power cycle since the first time, wherein the first time and current time are measured at the monitoring device that monitors the device, and wherein determining the system-up time comprises querying the device to determine the system-up time.

25. The article of manufacture of claim 22, wherein the device is capable of receiving and processing tasks, further comprising sending a task to the device, wherein the first time indicates a time when the task was sent to the device and determining the system-up time comprises querying the device to determine the system-up time.

26. The article of manufacture of claim 25, wherein the device maintains information on tasks the device is processing, further comprising:
   polling the device to obtain information on a polled task previously sent to the device;
   receiving a response from the device in response to the polling;
   indicating that the device includes information on the polled task after determining that the response indicates that the device includes information on the polled task; and
   performing another polling operation on the polled task after determining that the response indicates that the device includes information on the polled task.

27. The article of manufacture of claim 26, further comprising determining whether indication was made that the device includes information on the polled task, wherein determining the current time, the system-up time, and whether the device has started a new power cycle occurs after determining that the indication was not made that the device includes information on the polled task.

28. The article of manufacture of claim 26, further comprising:
   determining whether indication was made that the device includes information on the polled task; and
   terminating further polling of the device on the polled task after determining that the device does not include information on the polled task and after determining one of: (i) that the device started a new power cycle since the first time and (ii) that indication was made that the device previously included information on the polled task.

29. The article of manufacture of claim 28, further comprising performing another polling operation on the polled task at the predetermined interval after determining that the device did not start a new power cycle and after determining that no indication was previously made.

30. The article of manufacture of claim 28, wherein the device maintains information on the task for a predetermined time after completing processing of the task, wherein the predetermined interval does not exceed the predetermined time.

31. The article of manufacture of claim 26, wherein the device is a printer and the polled task is a print job.

* * * * *